(12) United States Patent
Cheng et al.

(10) Patent No.: US 7,960,479 B2
(45) Date of Patent: Jun. 14, 2011

(54) BRUSH COPOLYMERS

(75) Inventors: Chong Cheng, Williamsville, NY (US); Ezat Khoshdel, Wirral (GB); Karen Lynn Wooley, Chesterfield, MO (US)

(73) Assignee: Conopco, Inc., Englewood Cliffs, NJ (US)

( * ) Notice: Subject to any disclaimer, the term of this patent is extended or adjusted under 35 U.S.C. 154(b) by 57 days.

(21) Appl. No.: 12/515,979

(22) PCT Filed: Nov. 2, 2007

(86) PCT No.: PCT/EP2007/061812
§ 371 (c)(1),
(2), (4) Date: May 22, 2009

(87) PCT Pub. No.: WO2008/064972
PCT Pub. Date: Jun. 5, 2008

(65) Prior Publication Data
US 2010/0022741 A1 Jan. 28, 2010

(30) Foreign Application Priority Data

Nov. 27, 2006 (EP) .................................. 06124832

(51) Int. Cl.
C08F 277/00 (2006.01)
B32B 27/00 (2006.01)
C08G 61/06 (2006.01)

(52) U.S. Cl. ...................... 525/289; 525/285; 525/327.8; 525/902; 526/222; 428/500; 977/788

(58) Field of Classification Search .................. 526/171, 526/281, 286, 222; 525/285, 289, 327.8, 525/328.5; 428/500; 977/788
See application file for complete search history.

(56) References Cited
FOREIGN PATENT DOCUMENTS
WO 03/040218 5/2003

OTHER PUBLICATIONS

Xu et al, Synthesis and Characterization of . . . Poly(2-hydroxyethyl methacrylate-co-styrene)-graft-poly(e-caprolactone) by Sequential Controlled Polymerization, J. Poly. Sci.: Part A: Poly. Chem., 42, 5523-5529 (2004).*

PCT International Search Report in PCT application PCT/EP2007/061812.

Mahanthappa et al., "Synthesis of ABA Triblock Copolymers by a Tandem ROMP-RAFT Strategy", Macromolecules 2005, vol. 38, pp. 7890 to 7894.

Patton et al., "A Versatile Synthetic Route to Macromonorners via RAFT Polymerization", Macromolecules 2006, vol. 39, pp. 8674-8683.

Schimetta et al. "Ring-Opening Metathesis Polymerization fo the Bis(methyl carbonate) and Bis (S-methyl dithiocarbonate) of Norbornene and Thermal Conversion to Poly (cyclopentadienylenevinylene)", Macromolecules, 1993, vol. 27, No. 14, pp. 3769-3772.

* cited by examiner

Primary Examiner — Fred M Teskin
(74) Attorney, Agent, or Firm — Ronald A. Koatz; Karen Klumas

(57) ABSTRACT

A copolymer of formula 1 in which $M_1$ is a unit obtainable from ring opening metathesis polymerization (ROMP); R is an alkyl, ether, ester or aryl unit; $M_2$ and $M_3$ are independently selected from units obtainable by reversible addition fragmentation chain transfer polymerization (RAFT); X is a terminal unit selected from the group consisting of dithioester, trithiocarbonate, xanthate; and m is an integer from 2 to 1 million, n is an integer from 2 to 500,000 and k is an integer from 2 to 500,000.

(1)

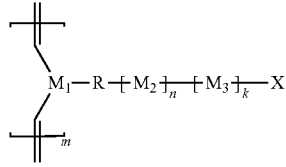

6 Claims, No Drawings

BRUSH COPOLYMERS

FIELD OF THE INVENTION

This invention relates to copolymeric materials and methods for making them.

BACKGROUND

As an important type of nanoscopically-sized single macromolecule, brush copolymers have attracted significant attention due to their special properties and interest in the development of elegant synthetic methods for their preparation as discussed in Zhang, M.; Müller, A. H. E. *J. Polym. Sci., Part A: Polym. Chem.* 2005, 43, 3461-3481.

Hsieh, H. L.; Quirk, R. P., *Anionic Polymerization: Principles and Practical Applications*. Marcel Dekker: New York, 1996 discloses that brush copolymers can be obtained generally by a "grafting from" (graft growth from a polymer backbone), a "grafting through" (polymerization of macromonomers), or a "grafting onto" approach (polymeric coupling reactions using a polyfunctional coupling agent). Unique brush copolymer nanostructures comprised of diblock grafts that impart a core-shell morphology, have also been prepared by "grafting from" approaches via ATRP or NMP as disclosed in Börner, H. G.; Beers, K.; Matyjaszewski, K.; Sheiko, S. S.; Möller, M. *Macromolecules* 2001, 34, 4375-4383. and Zhang, M.; Breiner, T.; Mori, H.; Müller, A. H. E. *Polymer* 2003, 44, 1449-1458. Zhang, M.; Drechsler, M.; Müller, A. H. E. *Chem. Mater.* 2004, 16, 537-543 discloses a Single macromolecular templates in the preparation of core-shell nanomaterials.

The present invention relates to polymer-based nano-objects having well-defined compositions, structures and properties in particular nanoscale single molecules as spheres, cylinders, and other shapes having a core-shell morphology.

The present invention allows for a higher degree of control over the entire macromolecular architecture and, therefore, has focused upon brush polymers and their transformations into other types of nanomaterials.

Because the synthesis of brush polymers typically normally requires complicated and time-consuming procedures, the present invention discloses a facile synthetic methods for the preparation of brush polymers.

DESCRIPTION OF THE INVENTION

The present invention relates to a brush copolymer of formula 1:

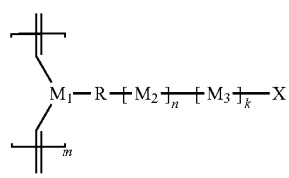

Formula 1 in which $M_1$ is a unit obtainable from ring opening metathesis polymerisation (ROMP);

R is an alkyl, ether, ester or aryl unit;

$M_2$ and $M_3$ are independently selected from units obtainable by reversible addition fragmentation chain transfer polymerization (RAFT);

X is a terminal unit selected from the group consisting of dithioester, trithiocarbonate, xanthate; and m is an integer from 2 to 1 million, n is an integer from 2 to 500,000 and k is an integer from 2 to 500,000.

The invention further relates to a core-shell brush copolymer of formula 3

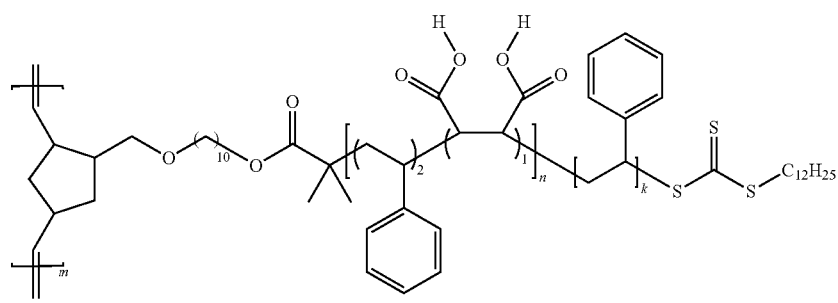

Formula 3 in which m is an integer from 2 to 1 million, n is an integer from 2 to 500,000 and k is an integer from 2 to 500,000.

A further aspect of the invention is a core-shell brush copolymer of formula 4

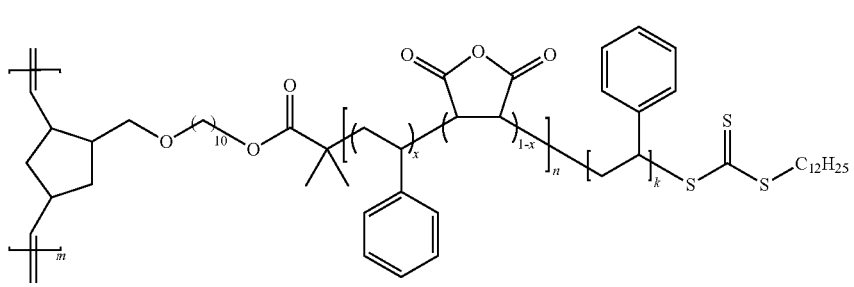

Formula 4 in which m is an integer from 2 to 1 million, x is a value from 0 to 1, n is an integer from 2 to 500,000 and k is an integer from 2 to 500,000.

The invention further relates to a method of manufacturing the above polymer in which the method of manufacture comprises the step of tandem ROMP (ring opening metathesis polymerisation) and RAFT (reversible addition fragmentation chain transfer polymerization).

DETAILED DESCRIPTION

The present invention relates to core-shell brush copolymers.

Core-Shell Brush Copolymers

The present invention relates to a composition comprising a brush copolymer of formula 1:

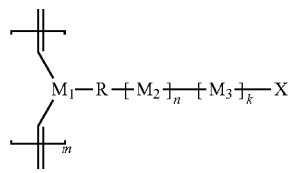

Formula 1 in which $M_1$ is a unit obtainable from ring opening metathesis polymerisation (ROMP) preferably a unit obtainable from the ring opening metathesis polymerisation (ROMP) of cyclooctadiene or norbornene.

R is an alkyl, ether, ester or aryl unit;

$M_2$ and $M_3$ are independently selected from units obtainable by reversible addition fragmentation chain transfer polymerization (RAFT), preferably units obtainable by reversible addition fragmentation chain transfer polymerization (RAFT) of styrene, isoprene, methyl acrylate, tert-butyl acrylate, dimethyl acryamide, acrylic acid, acrylonitrile, methyl methacrylate, maleic anhydride, vinyl acetate, vinyl pyridine or vinyl phenyl ketone;

X is a terminal unit selected from the group consisting of dithioester, trithiocarbonate, xanthate; and m is an integer from 2 to 1 million, preferably from 10 to 500,000, more preferably from 100 to 200,000, n is an integer from 2 to 500,000, preferably from 10 to 250,000, more preferably from 20 to 100,000 and k is an integer from 2 to 500,000, preferably from 10 to 250,000, more preferably from 20 to 100,000

Preferably the core shell brush copolymer has the structure of formula 2:

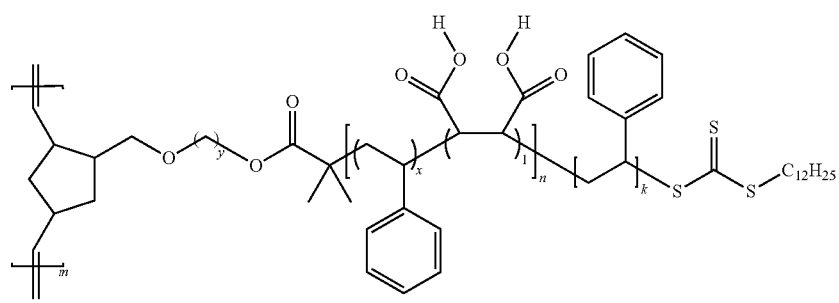

Formula 2 in which m is an integer from 2 to 1 million, and y is an integer from 2 to 18, x is an integer from 1 to 100, n is an integer from 2 to 500,000 and k is an integer from 2 to 500,000.

The core-shell brush copolymers of the invention are preferably particulate in nature, having dimensions ranging from 2 to 2000 nm and aspect ratios from 1 to 10000, as measured by dynamic light scattering, atomic force microscopy, transmission electron microscopy, or other standard means that are known to those in the art.

The core-shell brush copolymer is manufactured using the step of tandem ROMP (ring opening metathesis polymerisation) and RAFT (reversible addition fragmentation chain transfer polymerization).

The preferred reaction scheme is as follows:

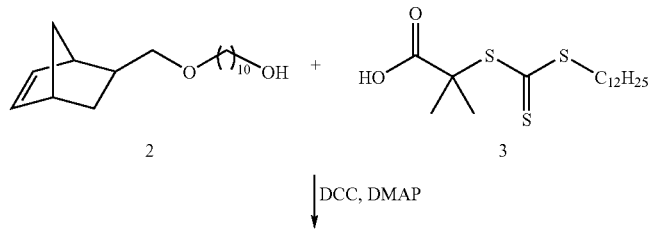

-continued

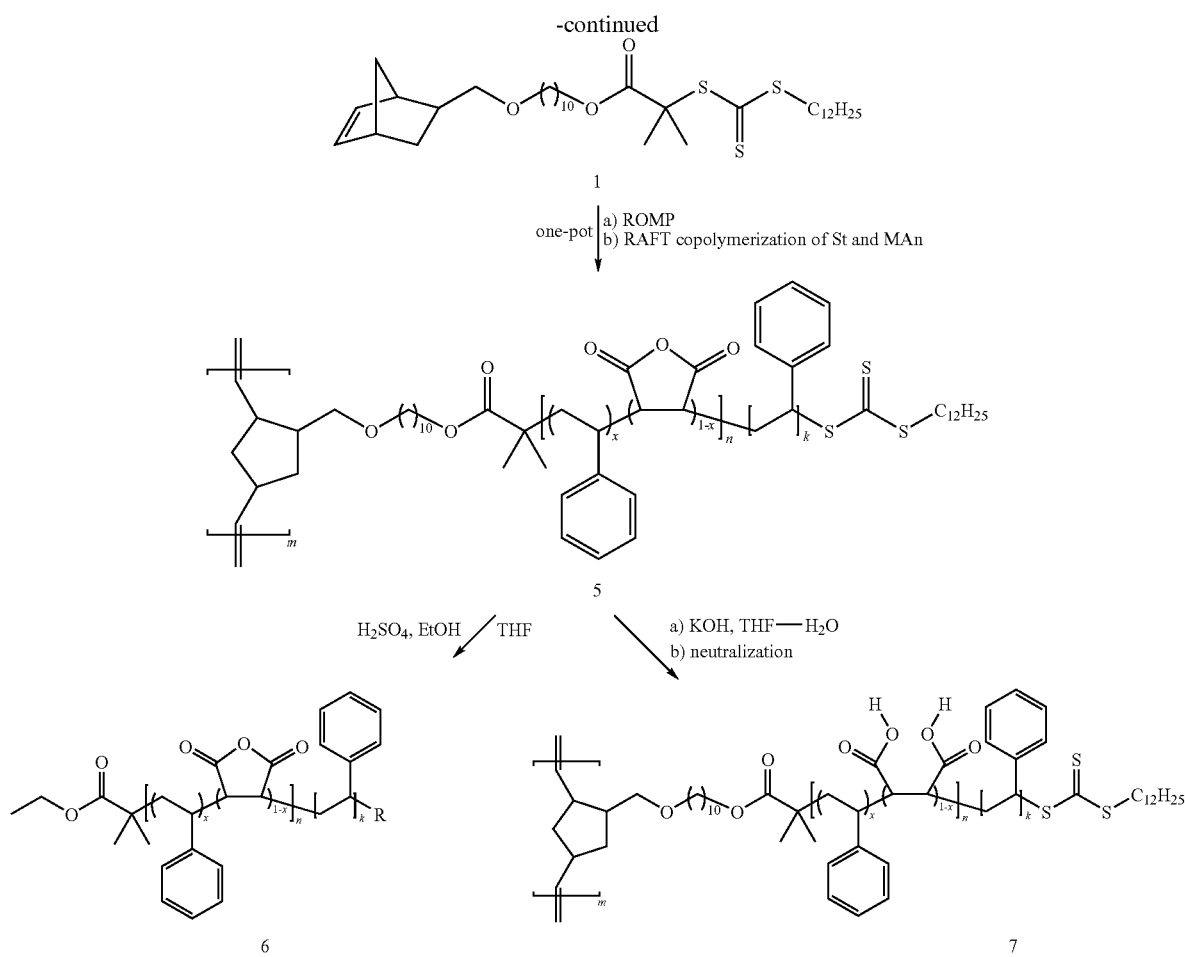

The core shell brush copolymer may be further polymerised so that it forms a nanocage. The nanocage is prepared by internal cross linking, in particulate internal cross linking. In the context of the present invention a nanocage can be defined as copolymeric polymer lined in such a manner that it forms a shell like structure. A highly preferable use of this shell like structure is for encapsulating material.

It is highly preferable if incorporated within the core-shell brush copolymer is a benefit agent.

EXAMPLES

The invention will now be described with reference to the following non-limiting examples. In the examples and throughout this specification, all percentages are by weight based on total composition and based on active material unless indicated otherwise.

Example 1

The One-Pot Synthesis and Loading of a Core-Shell Brush Copolymer from Small Molecule Reactants, by Tandem ROMP and RAFT Copolymerisation The one-pot synthesis and loading of a nanocage from small molecule reactants, by tandem ROMP and RAFT copolymerisation is shown in Scheme 2 below.

Scheme 2

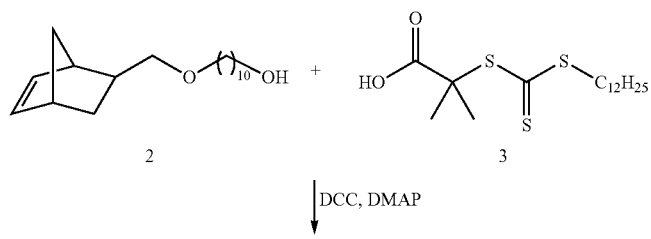

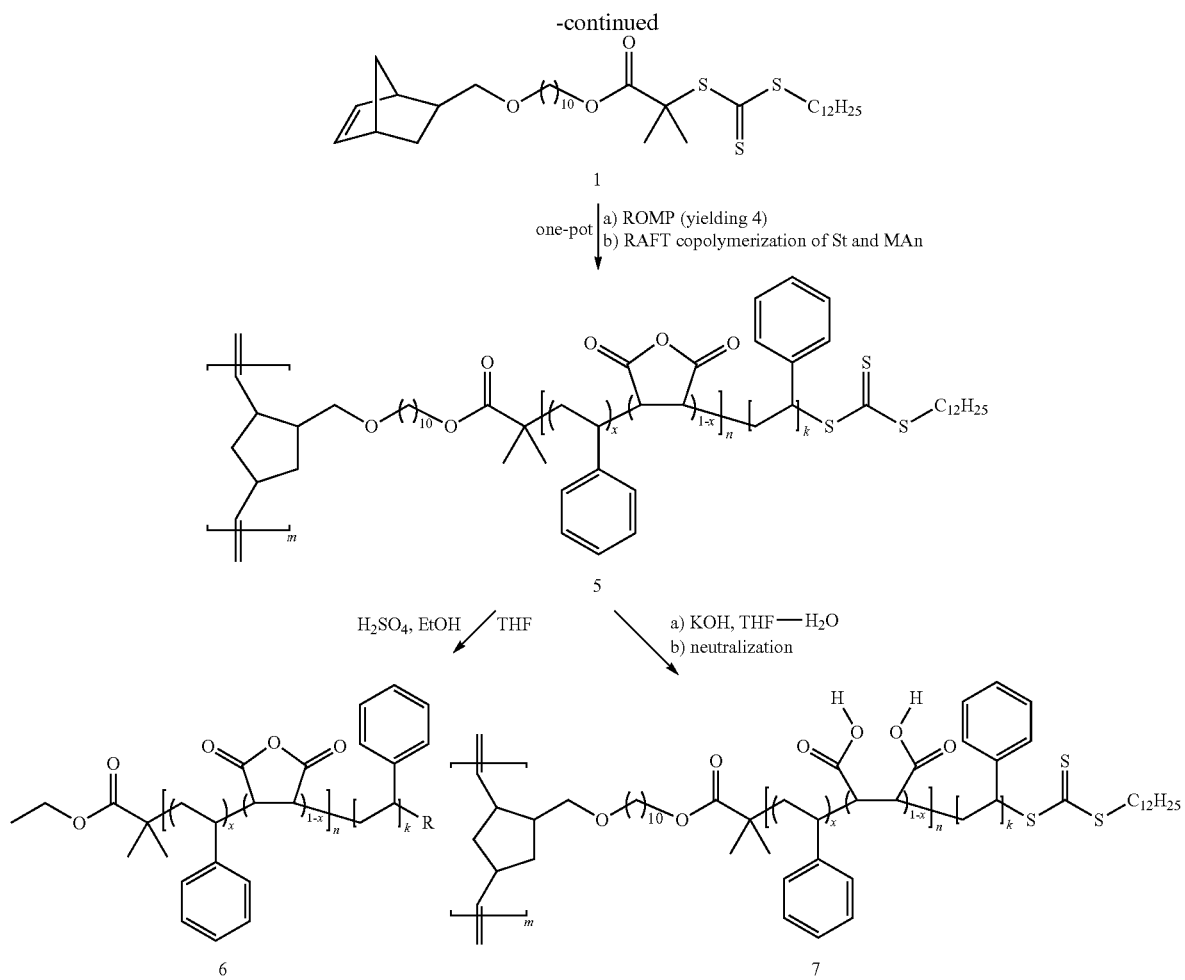

As a critical agent for the tandem synthesis of core-shell brush copolymer, an exo-norbornene-functionalized RAFT agent 1 was prepared in 87% yield by esterification of a norbornene-functionalized alcohol 2 with an acid-functionalized RAFT agent 3 (2.0 eq), using N,N'-dicyclohexylcarbodimide (DCC; 2.1 eq), and 4-(dimethylamino)pyridine (DMAP; 0.2 eq) in $CH_2Cl_2$ at room temperature for 11 h.[20]

$^1$H NMR analysis of 1 showed a series of characteristic resonances including those of norbornene alkene protons a and b (at 6.03-6.16 ppm), $CH_2OCO$ protons e (at 4.07 ppm), $CH_2OCH_2$ protons c and d and $SCH_2$ protons f (at 3.20-3.55 ppm), and $CH_3$ protons g (at 0.87 ppm). Their integration area ratios of 1.95:2.00:5.95:3.10 were in excellent agreement with the number ratio of protons of 2:2:6:3, verifying the molecular structure of 1.

One-pot preparation of core-shell brush copolymer from small molecule reactants was then performed by ROMP of the exo-norbornene-functionalized RAFT agent 1, followed by using the resulting polyfunctional RAFT agent and AIBN (as initiator) for "grafting from" via RAFT copolymerization of styrene (St) and maleic anhydride (MAn). The ROMP of 1 (99.7 mg) was conducted using Grubbs' catalyst $RuCl_2$ $(CHC_6H_5)$ $[P(C_6H_{11})_3]_2$ (0.02 eq) in $CH_2Cl_2$ at room temperature for 1 h. $^1$H NMR and GPC analyses of an aliquot of the reaction mixture (19 vol %, terminated by ethyl vinyl ether) determined the successful transformation of 1 into a well-defined polyfunctional RAFT agent.

Near complete conversion (>99%) of 1 was verified by essential absence of $^1$H NMR resonances of norbornene alkene protons of 1 at 6.03-6.16 ppm, and the formation of poly(1), i.e. 4, was supported by a series of characteristic resonances, including those of alkene protons a' and b' of the poly(norbornene)-based main-chain (at 5.00-5.50 ppm), $CH_2OCO$ protons e' (at 4.07 ppm), $CH_2OCH_2$ protons c' and d' and $SCH_2$ protons f' (at 3.20-3.55 ppm), and $CH_3$ protons g' (at 0.87 ppm). Their integration area ratios of 1.93:2.00:5.94:3.03 agreed very well with the number ratios of protons of 2:2:6:3, indicating quantitatively one RAFT functionality per repeat unit of 4. By GPC, 4 was found to have a $M_n$ of 40.6 kDa and a low polydisperisty index of 1.24. Relative to a calculated $M_n$ value of 31.5 kDa, the experimental $M_n$ value of 4 indicated an initiation efficiency of 78%.

By hydrolyzing the MAn units in the poly(St-stat-MAn) blocks into hydrophilic maleic acid units, 5 could be further converted into amphiphilic core-shell brush copolymer 7 (Scheme 1). Hydrolysis proceeded readily at room temperature under basic conditions using KOH (potassium hydroxide) to promote the reaction. Subsequent neutralization of the reaction solution gave 7. Both $^1$H NMR and FT-IR spectroscopic characterizations were used to compare 7 with its precursor 5. $^1$H NMR resonances of carboxylic protons centered at 12.0 ppm were observed by $^1$H NMR measurement of 7 in DMSO-$d_6$, verifying the presence of maleic acid units in 7. Critical differences between 7 and 5 were revealed by FT-IR. Core-shell brush copolymer 5 showed two C=O stretching frequencies at 1857 and 1778 cm$^{-1}$ for its cyclic anhydride groups and an absence of an O—H stretching absorbance. However, amphiphilic core-shell brush copolymer 7 possessed only one C=O stretching frequency at 1714 cm$^{-1}$ and a broad O—H stretching absorption at 2500-3500 cm$^{-1}$, indicating complete functional group transformation from the anhydrides to carboxylic acid groups. Additionally, different solubilities for 7 relative to 5 were found. For example, 5 was soluble in CDCl$_3$, but 7 was insoluble in CDCl$_3$ and could be dissolved by 1:2 CDCl$_3$-CD$_3$OD.

A nanocage prepared by crosslinking the amphiphilic core-shell brush copolymer brush 7 and loaded with 15 wt % salicylic acid, was synthesised following the above Scheme The sample, nanocage loaded with 15 wt % salicylic acid, was synthesized following Scheme 1. The amphiphilic core-shell brush copolymer 7 has a polynorbornene-based backbone, polyisoprene core, and poly(acrylic acid) shell. The shell cross-linking reaction of 7 was carried out using 0.11 eq of 2,2'-(ethylenedioxy)bis(ethylamine) cross-linker and 0.22 eq of 1-[3'-(dimethylamino)propyl]-3-ethylcarbodiimide methiodide (a catalyst) relative to the acrylic acid shell units of 7.

The polyisoprene core of the resulting shell cross-linked nanoparticle-8 was then degraded by ozone treatment, followed by reduction with Na$_2$SO$_3$. The nanocage-9 formed was then loaded with salicylic acid (~15 wt %) by stirring the 20% p-dioxane-water solution over 2 days, and then the solution was lyophilized to give dry sample.

The loading of salicylic acid into nanocage was proven by $^1$H NMR analysis (spectra attached). The nanocage sample loaded with salicylic acid also showed IR absorption at 3233 cm$^{-1}$, which was absent for nanocage-9. Tapping-mode AFM measurements indicated that there is detectable but not significant size change for nanocages before and after loading salicylic acid. Before loading, the nanocages have diameters ranging from 20 to 45 nm, with heights below 1.5 nm on mica; after loading, the nanocages have diameters ranging from 20 to 50 nm, with heights below 1.5 nm on mica. As a note, the water-solubility of nanocage sample can decrease due to lyophilization.

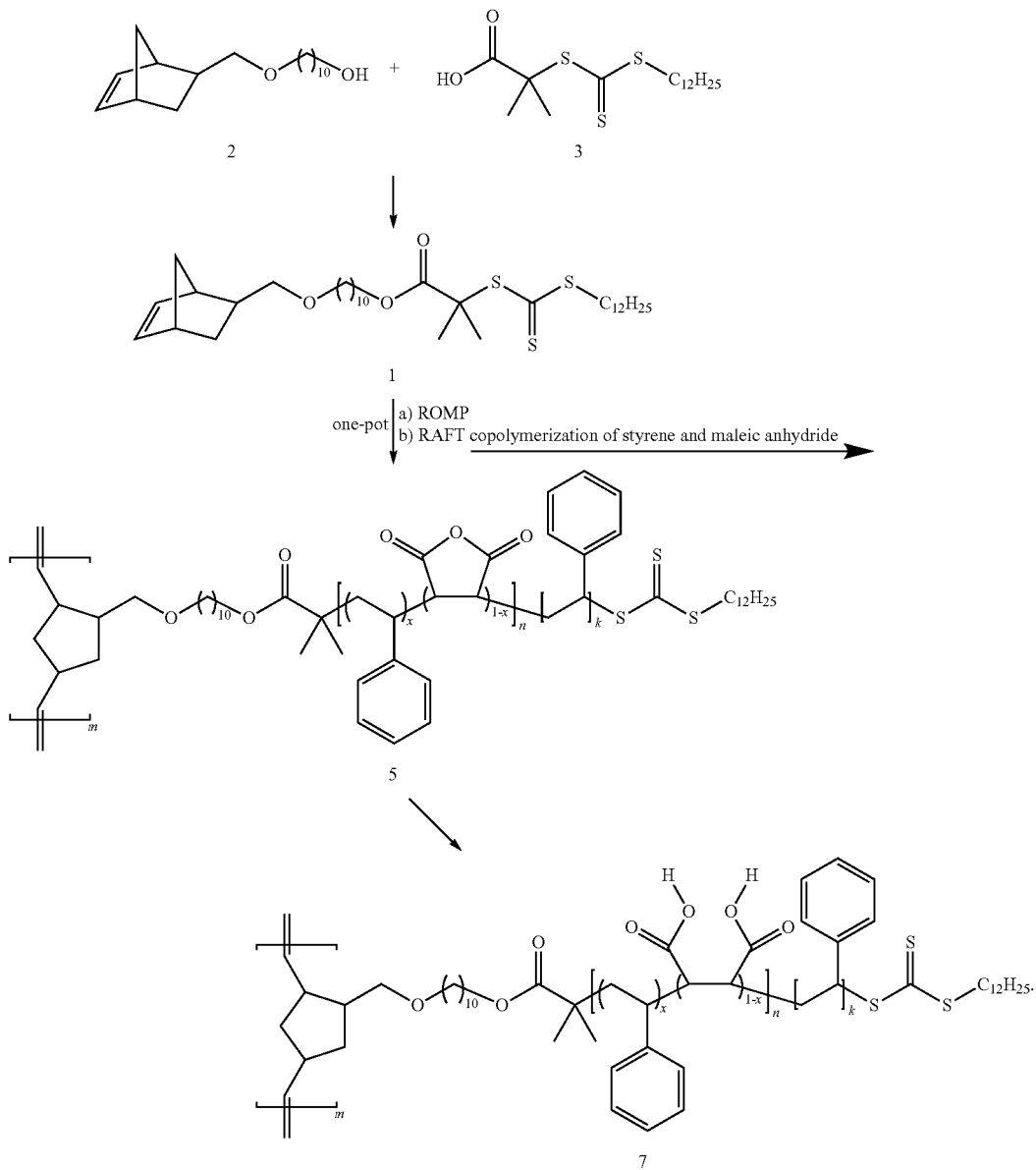

The invention claimed is:
1. An encapsulate comprising a copolymer of formula

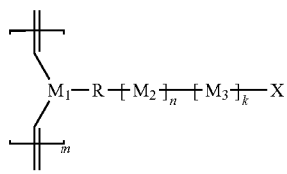

Formula 1 in which M$_1$ is a unit obtainable from ring opening metathesis polymerisation (ROMP);

R is an alkyl, ether, ester or aryl unit;

M$_2$ and M$_3$ are independently selected from units obtainable by reversible addition fragmentation chain transfer polymerization (RAFT);

X is a terminal unit selected from the group consisting of dithioester, trithiocarbonate, xanthate; and m is an integer from 2 to 1 million, n is an integer from 2 to 500,000 and k is an integer from 2 to 500,000; and an encapsulated material.

2. An encapsulate according to claim 1 wherein the copolymer is of formula 2

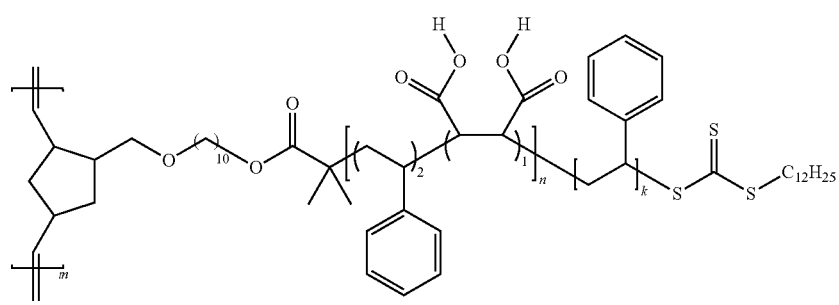

Formula 2 in which m is an integer from 2 to 1 million, n is an integer from 2 to 500,000 and k is an integer from 2 to 500,000.

3. An encapsulate according to claim 1 wherein the copolymer is of formula 3

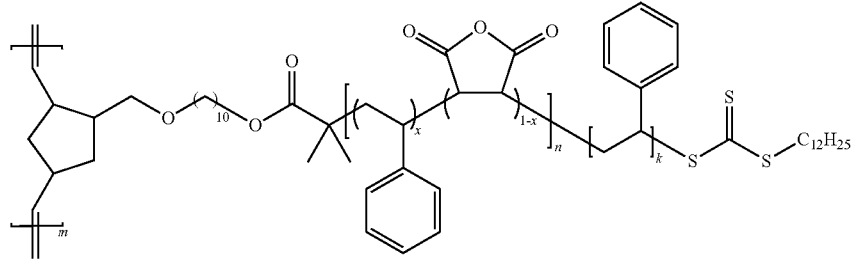

Formula 3 in which m is an integer from 2 to 1 million, x is a value from 0 to 1, n is an integer from 2 to 500,000 and k is an integer from 2 to 500,000.

4. An encapsulate according to claim 1 wherein the copolymer is in the form of a nanocage.

5. An encapsulate according to claim 1 wherein the copolymer is manufactured by a method that comprises the step of tandem ROMP (ring opening metathesis polymerisation) and RAFT (reversible addition fragmentation chain transfer polymerization.

6. An encapsulate according to claim 1 wherein the copolymer is manufactured by a method comprising the following reaction sequence.